United States Patent
Sanchez et al.

(10) Patent No.: US 8,565,701 B2
(45) Date of Patent: Oct. 22, 2013

(54) MULTI-BAND AND MULTI-MODE ANTENNA SYSTEM AND METHOD

(75) Inventors: Jorge Fabrega Sanchez, San Diego, CA (US); Ping Shi, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 421 days.

(21) Appl. No.: 12/939,841

(22) Filed: Nov. 4, 2010

(65) Prior Publication Data

US 2012/0113873 A1    May 10, 2012

(51) Int. Cl.
*H04B 1/18*  (2006.01)
*H04J 1/00*  (2006.01)

(52) U.S. Cl.
USPC ........................................ 455/168.1; 370/343

(58) Field of Classification Search
USPC .......... 370/331–334, 276–278, 280, 281, 343, 370/344, 319, 373; 455/73, 422.1, 260, 455/432.1–444, 450.1, 552.1, 561, 168.1, 455/101, 161.1
See application file for complete search history.

(56) References Cited

U.S. PATENT DOCUMENTS

| | | | |
|---|---|---|---|
| 6,175,746 B1 | 1/2001 | Nakayama et al. | |
| 6,751,470 B1 | 6/2004 | Ellä et al. | |
| 6,990,357 B2 | 1/2006 | Ellä et al. | |
| 7,092,678 B2 | 8/2006 | Shih | |
| 7,656,251 B1 | 2/2010 | Bauder et al. | |
| 7,729,724 B2 | 6/2010 | Rofougaran et al. | |
| 7,917,170 B2 * | 3/2011 | Zhitnitsky | 455/552.1 |
| 2002/0101907 A1 | 8/2002 | Dent et al. | |
| 2005/0212708 A1 | 9/2005 | Fifield | |
| 2006/0052131 A1 | 3/2006 | Ichihara | |
| 2006/0092079 A1 | 5/2006 | de Rochemont | |
| 2007/0085754 A1 | 4/2007 | Ella et al. | |
| 2007/0135171 A1 | 6/2007 | Hara | |
| 2008/0165063 A1 | 7/2008 | Schlub et al. | |
| 2009/0180403 A1 * | 7/2009 | Tudosoiu | 370/278 |
| 2010/0105425 A1 * | 4/2010 | Asokan | 455/552.1 |
| 2011/0014879 A1 * | 1/2011 | Alberth et al. | 455/75 |
| 2011/0014958 A1 * | 1/2011 | Black et al. | 455/575.7 |
| 2011/0210787 A1 * | 9/2011 | Lee et al. | 330/126 |

FOREIGN PATENT DOCUMENTS

| | | |
|---|---|---|
| CN | 19992935 A | 7/2007 |
| CN | 101627537 A | 1/2010 |
| WO | WO 99/08395 | 2/1999 |
| WO | WO 2006/085139 A2 | 8/2006 |
| WO | WO 2007/079987 A1 | 7/2007 |
| WO | WO 2007/080040 A1 | 7/2007 |

OTHER PUBLICATIONS

PCT International Search Report, International Application No. PCT/CN2011/081473, mailing date: Jan. 19, 2012, 10 pages.

* cited by examiner

*Primary Examiner* — Hanh N Nguyen

(74) *Attorney, Agent, or Firm* — Slater & Matsil, L.L.P.

(57) ABSTRACT

An antenna system is disclosed. A wireless device includes two antennas. The first antenna is optimized at a first frequency band. The second antenna is optimized at a second frequency band. The signals received from respective optimized frequency bands are used as primary received signals. The signals having frequencies beyond respective optimized frequency bands are used as diversity signals. Likewise, the signals transmitted from a transceiver to base stations are sent to respective antennas based upon their frequency bands. By employing this optimized antenna configuration, the wireless device can provide high quality wireless signals for both frequency bands.

14 Claims, 4 Drawing Sheets

MULTI-BAND AND MULTI-MODE ANTENNA SYSTEM AND METHOD

TECHNICAL FIELD

The present invention relates generally to wireless communication systems and methods, and more particularly to multi-band and multi-mode antenna system and method.

BACKGROUND

Wireless communication systems are widely used to provide voice and data services for multiple users using a variety of access terminals such as cellular telephones, laptop computers and various multimedia devices. Such communications systems can encompass local area networks, such as IEEE 801.11 networks, cellular telephone and/or mobile broadband networks. The communication system can use one or more multiple access techniques, such as Frequency Division Multiple Access (FDMA), Time Division Multiple Access (TDMA), Code Division Multiple Access (CDMA), Orthogonal Frequency Division Multiple Access (OFDMA), Single Carrier Frequency Division Multiple Access (SC-FDMA) and others. Mobile broadband networks can conform to a number of standards such as the main $2^{nd}$-Generation (2G) technology Global System for Mobile Communications (GSM), the main $3^{rd}$-Generation (3G) technology Universal Mobile Telecommunications System (UMTS) and the main $4^{th}$-Generation (4G) technology Long Term Evolution (LTE).

As technologies evolve, different generation standards may co-exist in a wireless network for a period. For example, when a wireless device user moves from one region covered by GSM to another region covered by UMTS, the user demands a seamless handover between two standards. Such a seamless handover requires a multi-mode wireless device. On the other hand, in specific regions of the world, each standard may operate within different frequency bands. In order to accommodate different frequency bands in a wireless system, the wireless device must have a multi-band communication capability. In short, a modern wireless device such as a mobile phone must be a multi-band and multi-mode device.

Each wireless standard may have different frequency bands. For example, GSM may operate on frequency bands in a range around 850 Megahertz (MHz), 900 MHz, 1800 MHz and 1900 MHz. Similarly, UMTS may operate on even diversified frequency bands in a range from low 800 MHz up to 2200 MHz. CDMA may operate on frequency bands in a range around 850 MHz and 1900 MHz. LTE may support both future and existing frequency bands used by current 3G systems. In consideration of the antenna design of a wireless device, frequency bands around 850 MHz and 900 MHz are defined as a low-band frequency. Likewise, frequency bands above 1700 MHz are defined as a high-band frequency.

A wireless device capable of operating in multi-band frequencies may have at least two antennas so that both high-band frequency signal and low-band frequency signal reception/transmission can be optimized. For example, when a mobile phone is operating in a wireless system having both GSM bands and UMTS bands, it has one primary antenna and one secondary antenna. The primary antenna usually has a higher efficiency than the secondary antenna. Traditionally, some important signals such as transmitted signals and primary received signals are connected to the primary antenna to achieve best performance. However, as more and more access techniques are deployed, the existing primary-secondary antenna architecture may not deliver the highest performance for all frequency bands. Therefore, there is an ever increasing pressure to improve the performance of these two antennas.

SUMMARY OF THE INVENTION

These and other problems are generally solved or circumvented, and technical advantages are generally achieved, by preferred embodiments of the present invention which provide multi-band and multi-mode antenna system and method.

In accordance with an embodiment, an apparatus comprises a first antenna designed to be efficiently operable at a first frequency band, a second antenna designed to be efficiently operable at a second frequency band and a transceiver. The transceiver further comprises a first group of ports receiving primary signals within the first frequency band, a second group of ports receiving diversity signals within the second frequency band, a third group of ports transmitting a first group of transmitted signals within the first frequency band, a fourth group of ports transmitting a second group of transmitted signals within the second frequency band, a fifth group of ports receiving primary signals within the second frequency band and a sixth group of ports receiving diversity signals within the first frequency band.

The apparatus further may include a plurality of radio-frequency (RF) front-end modules being configured to direct primary signals within the first frequency band from the first antenna to the first group of ports, direct diversity signals within the second frequency band from the first antenna to the second group of ports, direct the first group of transmitted signals from the third group of ports to the first antenna, direct the second group of transmitted signals from the fourth group of ports to the second antenna, direct primary signals within the second frequency band from the second antenna to the fifth group of ports, and direct diversity signals within the first frequency band from the second antenna to the sixth group of ports.

In accordance with another embodiment, a method of optimizing a multi-band and multi-mode antenna system is disclosed. The method includes providing a first antenna optimized at a first frequency band and a second antenna optimized at a second frequency band, then, directing transmitted signals having frequencies within the first frequency band from the transceiver to the first antenna, directing transmitted signals having frequencies within the second frequency band from the transceiver to the second antenna, directing signals having frequencies within the first frequency band from the first antenna to a transceiver's primary signal ports for the first frequency band, directing signals having frequencies within the second frequency band from the first antenna to a transceiver's diversity signal ports for the first frequency band, directing signals having frequencies within the second frequency band from the second antenna to a transceiver's primary signal ports for the second frequency band and directing signals having frequencies within the second frequency band from the first antenna to a transceiver's diversity signal ports for the second frequency band.

In accordance with yet another embodiment, a system comprises a transceiver, a first antenna designed to be efficiently operable at a first frequency, a second antenna designed to be efficiently operable at a second frequency and a plurality of RF front-end modules being configured to direct signals having the first frequency from the first antenna to a first primary signal port of the transceiver, signals having second frequency from the first antenna to a first diversity signal port of the transceiver, signals having the second frequency from the second antenna to a second primary signal port of the transceiver, signals having the first frequency from the second antenna to a second diversity signal port of the transceiver.

The system further may include a plurality of duplexers configurable to provide high isolation between signals from the plurality of RF front-end modules to the transceiver and signals from the transceiver to the plurality of RF front-end modules and a plurality of power amplifiers being configured to amplify signals from the transceiver to the plurality of RF front-end modules.

An advantage of an embodiment is that the antenna system provides high performance wireless signals for different frequency bands as well as a compact and cost-effective antenna system for a multi-band and multi-mode wireless device.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely multi-band and multi-mode antenna system for a wireless device. The invention may also be applied, however, to a variety of radio frequency transmitting and receiving antennas in the wireless network.

Figure 1:
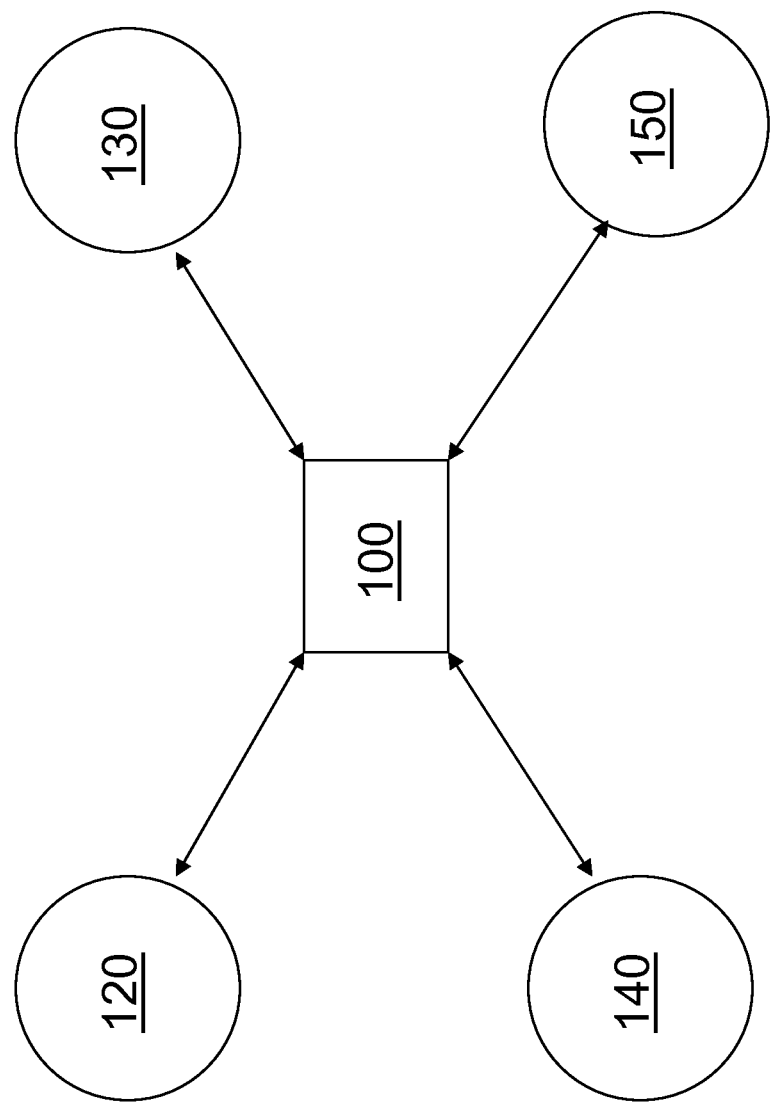
FIG. 1 illustrates a simplified block diagram of a wireless network.

Referring initially to FIG. 1, a wireless network is illustrated. The illustrated wireless network may accommodate $2^{nd}$-Generation (2G) standards such as Global System for Mobile Communications (GSM) and $3^{rd}$-Generation (3G) standards such as Universal Mobile Telecommunications System (UMTS). As known in the art, UMTS may be referred to as Wideband Code Division Multiple Access (WCDMA). Throughout the description, UMTS and WCDMA are used interchangeably.

The wireless network may include a wireless device 100, a first base station 120, a second base station 130, a third base station 140 and a fourth base station 150. It should be recognized that while FIG. 1 may illustrate the wireless network system having one wireless device and four base stations, the wireless network may accommodate any number of wireless devices and base stations and still remain within the scope of the present invention.

The wireless device 100 may be a notebook computer, a mobile phone or a Personal Digital Assistant (PDA), a media player, a gaming device or the like. In the wireless network, because the emerging 3G standards such as UMTS is operating on the existing 2G GSM network, the wireless network is required to support both the emerging standard and the exiting 2G standards. As a result, each base station may be capable of providing wireless signals based upon either GSM or UMTS. For example, the base station 120 may transmit and receive wireless signals modulated based upon the GSM standard; the base station 130 may transmit and receive wireless signals modulated based upon the UMTS standard. The base stations 140 and 150 may include two sub-stations, which may transmit and receive GSM and UMTS wireless signals respectively. When the wireless device 100 migrates from a region covered by one base station (e.g., the first base station 120) to another region covered by a different base station (e.g., the second base station 130), the wireless device 100 may transmit and receive different frequency band wireless signals modulated based upon different wireless standards.

Figure 2:
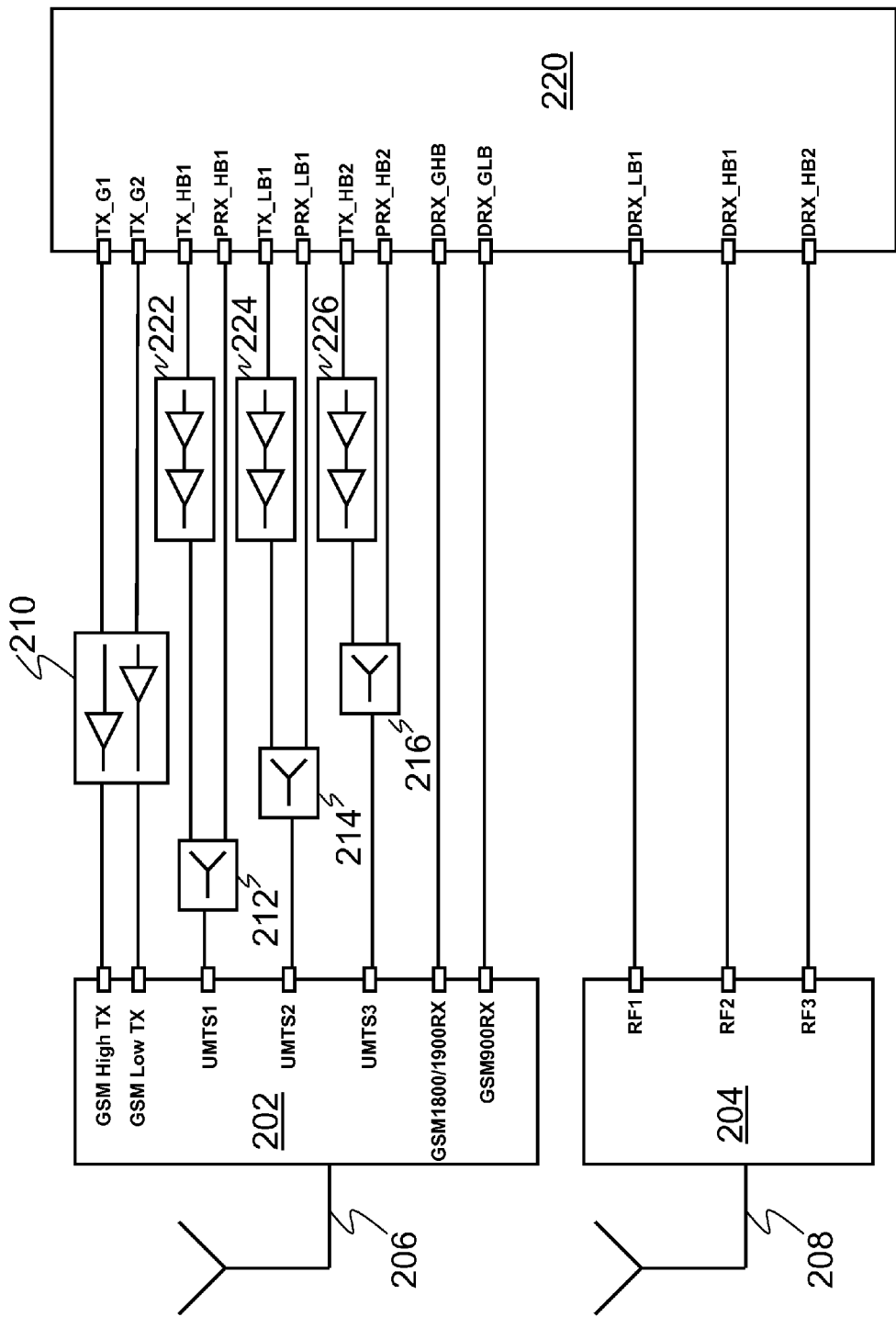
FIG. 2 illustrates a simplified block diagram of the antenna system of a traditional wireless device.

FIG. 2 illustrates a simplified block diagram of the antenna system of a traditional wireless device. The traditional wireless device includes two antennas. A primary antenna 206 is communicably coupled to a Radio-Frequency (RF) front-end module 202. A secondary antenna 208 is communicably coupled to a RF front-end switch module 204. The primary antenna 206 is configured to transmit outbound wireless signals from the wireless device to a base station (illustrated in FIG. 1) or receive inbound wireless signals from the base station. The secondary antenna 208, as an auxiliary antenna, may not be able to transmit high performance outbound signals from the wireless device to the base station. The main function of the secondary antenna 208 is receiving diversity wireless signals.

In accordance with an embodiment, the RF front-end module 202 is capable of transmitting and receiving wireless signals to and from base stations in a network compatible with both the GSM and UMTS standards. The RF front-end module 202 includes seven transmit and receive ports. Based upon the nature and function of these ports, the ports of the RF front-end module 202 can be divided into three sections: a GSM transmit section, a UMTS section and a GSM receive section. It should be noted that while FIG. 2 illustrates only seven ports, the RF front-end module 202 could accommodate any number of ports. The diagram of the RF front-end module 202 is merely an example, which should not unduly limit the scope of the claims.

The GSM transmit section includes two ports, namely GSM high TX and GSM low TX. GSM high TX is a transmit port dedicated to transmitting high frequency GSM wireless signals. As described above, high frequency GSM wireless signals have a range above 1800 Megahertz (MHz). GSM low TX is a transmit port for transmitting low frequency GSM wireless signals. GSM low frequencies refer to frequency bands around 850 MHz and 900 MHz.

UMTS1, UMTS2 and UMTS3 are three ports configurable to transmit and receive wireless signals modulated under the UMTS standard. UMTS has a variety of operating bands depending on wireless carriers' frequency spectrum licenses. For example, in North America, the UMTS standard has an operating band in a range between 700 MHz and 2150 MHz. Such a range can be divided into a high frequency band in a range above 1800 MHz and a low frequency band in a range between 700 MHz and 900 MHz. Accordingly, RF front-end modules have high frequency ports and low frequency ports for receiving and transmitting high frequency and low frequency wireless signals respectively.

The UMTS section includes three ports, namely UMTS1, UMTS2 and UMTS3. UMTS1 port carries high frequency UMTS wireless signals. Likewise, UMTS2 port is responsible for transmitting and receiving low frequency UMTS wireless signals. UMTS3 port may be another port carrying high frequency UMTS wireless signals. It should be noted that the RF front-end module 202 includes only three UMTS ports of a front-end module that may include hundreds of such UMTS ports. The number of UMTS ports illustrated herein is limited solely for the purpose of clearly illustrating the inventive aspects of the various embodiments. The present invention is not limited to any specific number of UMTS ports.

The RF front-end module 202 further includes a GSM 1800/1900 RX port for receiving GSM wireless signals in a range between 1800 MHz and 1900 MHz and a GSM 900 RX port for receiving GSM wireless signals having a frequency band around 900 MHz. In the RF front-end module 202, the GSM receive ports are separated from the GSM transmit ports because a GSM received signal may be coupled with a GSM transmitted signal if they share a common port via a duplexer. As known in the art, a GSM received signal may overlap with a GSM transmitted signal unless the duplexer can provide high isolation between these two signals. In order to achieve high performance and interference free GSM wireless signals, each GSM receiving or transmitting channel has its own port.

Unlike the GSM receive and transmit ports in the RF front-end module 202, UMTS1, UMTS2 and UMTS3 are connected to duplexers 212, 214 and 216 respectively. As illustrated in FIG. 2, a UMTS received signal (e.g., PRX_HB1) in a frequency band and its corresponding transmitted signal (e.g., TX_HB1) in the same frequency band share the same port (e.g., UMTS1) via a duplexer (e.g., the duplexer 212). The duplexer can provide isolation between the transmitted signal and the received signal.

The RF front-end switch module 204 includes three ports RF1, RF2 and RF3. The secondary antenna 208 receives diversity wireless signals. As known in the art, spatial diversity wireless signals can be used to improve received signals' quality. More specifically, wireless signals may deteriorate due to fading and interference. The fading and interference induced errors can be corrected by transmitting wireless signal through two channels having different characteristics. For example, in FIG. 2, the primary antenna 206 receives primary wireless signals and forwards the primary wireless signals to a transceiver 220 via the RF front-end module 202. The secondary antenna 208 receives diversity wireless signals and forwards the diversity wireless signals to the transceiver 220 via the RF front-end switch module 204. Because the primary wireless signals and the diversity wireless signals carry the same content but go through two channels having different characteristics, they may experience different levels of fading. By comparing these two types of signals having the same content but different fading levels, in accordance with well-known post processing techniques, the transceiver 220 may reduce or eliminate the fading induced errors.

As known in the art, the GSM standard does not require a diversity hardware structure. The transceiver 220, as a device compatible with the GSM standard, includes two ports, namely DRX_GHB and DRX_GLB for receiving high frequency and low frequency diversity GSM signals respectively. DRX_GHB and DRX_GLB are coupled to GSM1800/1900 RX and GSM900 RX ports respectively. In accordance with the UMTS standard, a diversity hardware structure is required to improve received signals' quality. As a result, the transceiver 220 includes ports for receiving diversity received signals (DRX). DRX_LB1 is dedicated to receive DRX in a low frequency band. DRX_HB1 and DRX_HB2 are designated to receive DRX in high frequency bands. DRX_LB1, DRX_HB1 and DRX_HB2 are coupled to RF1, RF2 and RF3 of the RF front-end switch module 204 respectively.

The transceiver 220 further includes three ports for receiving primary received signals (PRX). PRX_HB1 is a port receiving high frequency UMTS primary signals. PRX_HB1 is coupled to UMTS1 via a first input of the duplexer 212. Similarly, PRX_LB1 is a port receiving low frequency UMTS primary signals. PRX_LB1 is coupled to UMTS2 via a first input of the duplexer 214. Furthermore, the transceiver 220 may include a second port PRX_HB2 for receiving high frequency UMTS primary signals. PRX_HB2 is coupled to UMTS3 via a first input of the duplexer 216.

The transceiver 220 further includes three UMTS transmit ports. Each transmit port is coupled to an internal transmitter (not shown). The internal transmitter modulates data in accordance with the UMTS standard and adds the modulated signal on a carrier signal to generate a modulated UMTS signal. TX_HB1 is a transmit port connecting to a power amplifier 222, which is configured to amplify signals having frequencies in a range between 1800 MHz and 1900 MHz. The output of the power amplifier 222 is coupled to a second input of the duplexer 212. Likewise, TX_LB1 and TX_HB2 are responsible for transmitting low frequency and high frequency UMTS signals. Power amplifiers 224 and 226 are configured to amplify signals having low frequencies and high frequencies respectively. The output of the power amplifier 224 is coupled to a second input of the duplexer 214. Similarly, the output of the power amplifier 226 is coupled to a second input of the duplexer 216. In sum, UMTS signals are amplified to an appropriate level and then sent to the RF front-end module 202, which further directs amplified UMTS signals to adjacent base stations via the primary antenna 206.

The transceiver 220 may also comprise two ports for transmitting GSM signals. TX_G1 is dedicated to transmit high frequency GSM signals, such as GSM 1800 MHz or GSM 1900 MHz signals. TX_G2 is responsible for transmitting low frequency GSM signals, such as GSM 850 MHz or GSM 900 MHz signals. Both TX_G1 and TX_G2 are coupled to the two inputs of a power amplifier 210. The power amplifier 210 amplifies the input wireless signals to an appropriate level and sends the amplified GSM transmitted signals to GSM High TX and GSM Low TX of the RF front-end module 202.

As described above with respect to FIG. 2, in order to employ a spatial diversity technique, a traditional wireless device adopts two antennas. However, due to physical size constraints, only the primary antenna 206 can transmit and receive high performance wireless signals. The secondary antenna 208 may be not as efficient as the primary antenna. On the other hand, even though the primary antenna 206 is efficient and capable of transmitting and receiving high quality wireless signals, the primary antenna 206 can only be optimized at a particular frequency band. Generally, it is difficult to transmit and receive wireless signals across a broad frequency range by using a single primary antenna.

Figure 3:
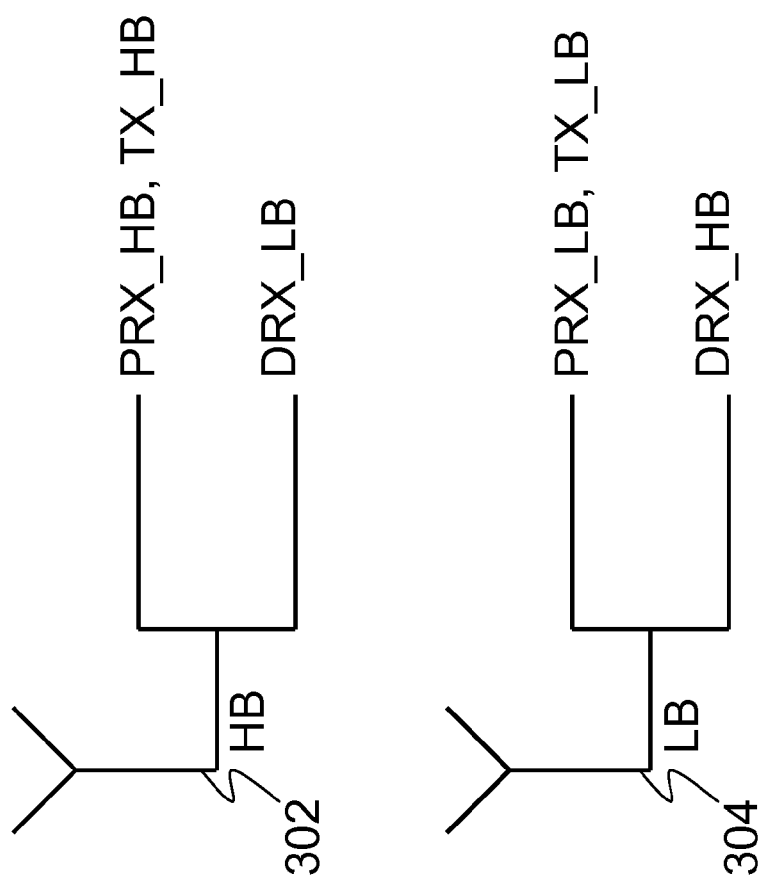
FIG. 3 illustrates two antennas in accordance with an embodiment.

FIG. 3 illustrates a block diagram of an embodiment system having two antennas. The first antenna 302 is optimized at a high frequency band such as frequencies over 1800 MHz. Although the first antenna 302 is still capable of transmitting and receiving wireless signals in a broad range, the quality of the low frequency wireless signals such as signals having frequencies around 850 MHz may not be as good as that of the high frequency signals. Nevertheless, the low frequency signals received from the first antenna 302 can be used as low frequency diversity signals. In sum, the first antenna 302 is optimized to transmit and receive high quality high frequency signals. At the same time, the low frequency signals received from the first antenna 302 are used as low frequency diversity signals.

Likewise, a second antenna 304 is optimized at a low frequency such as 850 MHz. The optimized design of the second antenna 304 at the low frequency enables the second antenna 304 to transmit and receive high quality low frequency signals. Similarly, the high frequency signals received from the second antenna 304 are used as high frequency diversity signals. One advantageous feature of this configuration is that a optimized design of an antenna at a relatively narrow frequency band may reduce the physical size of an antenna as well as the design difficulties. In addition, based upon this configuration, both high and low frequency signals received from an antenna can be fully utilized for different purposes.

Figure 4:
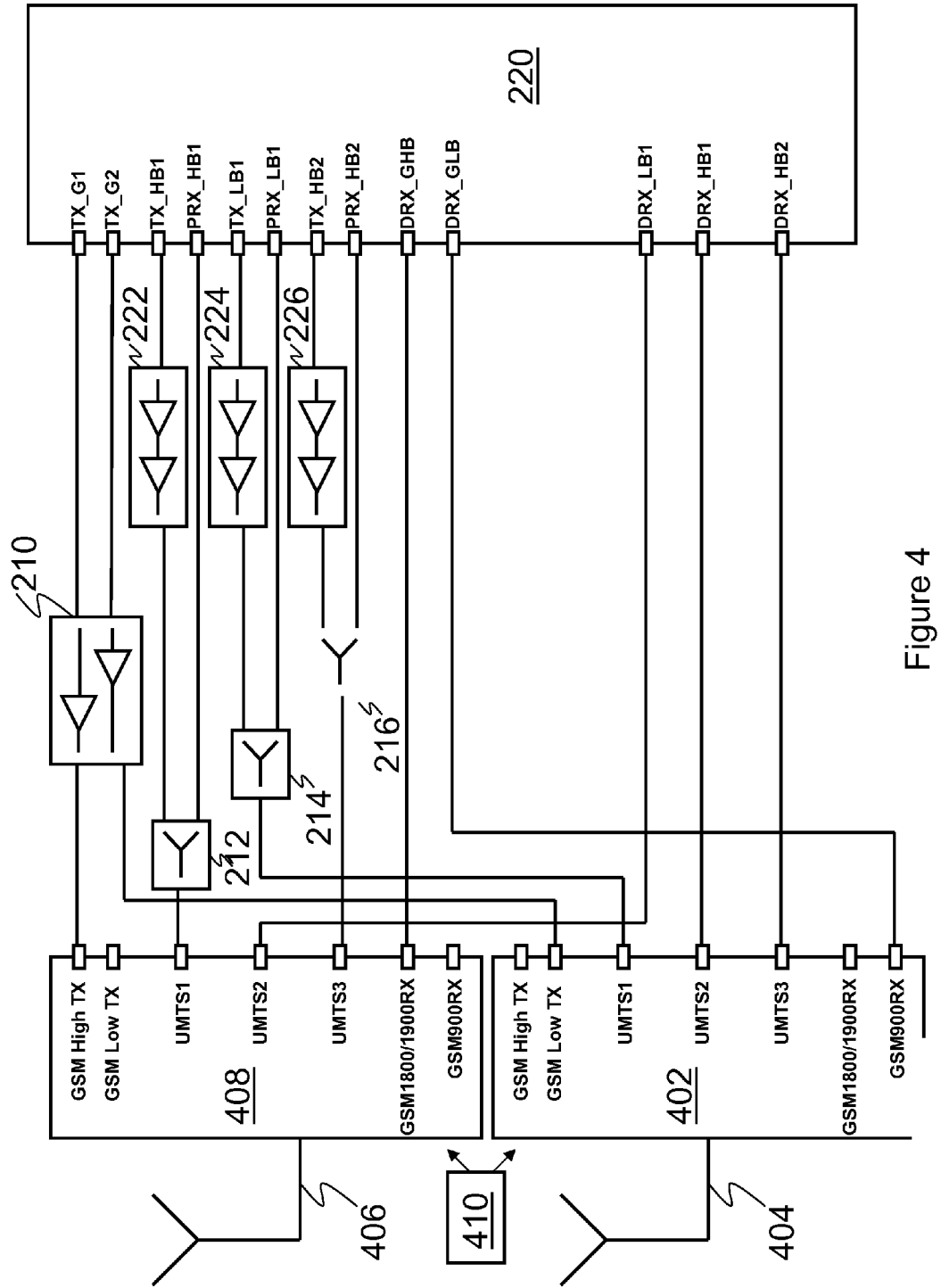
FIG. 4 illustrates an example of an optimized antenna system in accordance with an embodiment.

FIG. 4 illustrates an example of an embodiment antenna system in accordance with an embodiment. As wireless technologies evolve, modern wireless systems may accommodate more than one wireless standard. In addition, each wireless standard may have a plurality of frequency bands due to different radio spectrum allocations in different regions. The antenna architecture may become complicated and expensive if a single antenna is used to transmit and receive multi-band wireless signals. On the other hand, an interference environment surrounding a wireless device requires a spatial diversity based antenna architecture to improve the reliability of wireless signals. The spatial diversity based antenna architecture requires at least two antennas. As a result, an optimized system having two antennas is needed.

In accordance with an embodiment, the optimized antenna system includes two antennas. An antenna 406 is designed to be efficiently operating at a high frequency band such as 1800 MHz. An antenna 404 is designed to be efficiently operating at a low frequency band such as 850 MHz. As known in the art, if the physical size of an antenna is fixed, the result of the bandwidth of an antenna multiplied by the efficiency of the antenna is a constant value. That is, if an antenna can cover a wide bandwidth, its efficiency may drop because the product of the bandwidth multiplied by the efficiency is constant. As a result, the proposed method optimizes each antenna at a relatively narrow frequency band (e.g., high frequency around 1800 MHz). Such a narrow frequency band allows each antenna having high performance at its optimized frequency band. Beyond the optimized frequency band, the antenna may have a gain roll-off. The wireless signals at the gain roll-off frequency band may not qualify as primary received signals. However, they may be used as diversity received signals so that each antenna can be fully utilized.

As illustrated in FIG. 4, the antenna 406 is coupled to a RF front-end module 408. The antenna 404 is coupled to a RF frond-end module 402. Both the RF front-end modules 402 and 408 have similar functions as the RF front-end module 202. Both the RF front-end modules 408 and 402 have a plurality of ports, which are coupled to the transceiver 220. In accordance with an embodiment, when the transceiver modulates a high frequency wireless signal such as a GSM signal having 1800 MHz, a processor 410 controls the port TX_G1 of the transceiver 220 to direct the wireless signal to the antenna 406 via the RF front-end module 408. In contrast, when the transceiver modulates a low frequency wireless signal such as a GSM signal having 850 MHz, the processor 410 controls the port TX_G2 of the transceiver 220 to direct the wireless signal to the antenna 404 via the RF front-end module 402. By employing this control scheme, both high performance frequency bands of antennas 404 and 406 are fully utilized.

As a multi-mode wireless device, the transceiver 220 is capable of transmitting and receiving GSM signals as well as UMTS signals. According to the UMTS standard, UMTS received signals can be classified into two groups, namely primary received signals and diversity received signals. The primary received signals are required to have high performance at their frequency bands. The diversity received signals' performance may not be as high as the primary received signals' performance. As illustrated in FIG. 4, because the antenna 406 is optimized at a high frequency band, the primary high frequency received signals are directed from the antenna 406 to the port PRX_HB1 of the transceiver 220 via the RF front-end modules 408. The antenna 406 may also receive low frequency signals. However, a gain roll-off may occur in the low frequency signals because they do not fall into the optimized high frequency band of the antenna 406. The low frequency signals having a gain roll-off are directed to the port DRX_LB1 of the transceiver 220. The transceiver 220 uses the signals received at the port DRX_LB1 as low frequency diversity signals.

Likewise, the antenna 404 is optimized at a low frequency band. The low frequency signals received at the antenna 404 are directed to the port PRX_LB1 as primary low frequency signals. The high frequency signals having a gain roll-off are directed from the antenna 404 to a diversity port of transceiver 220 (e.g., DRX_HB1). One advantageous feature of having two antennas optimized at different frequency bands is that both antennas can achieve high performance at their respective optimized frequency bands. In addition, the wireless signals from both antennas are fully utilized based upon their signal handling quality.

As illustrated in FIG. 4, when the transceiver 220 modulates UMTS signals, the high frequency signals (e.g., signals from TX_HB1) are directed to the antenna 406 via the RF front-end module 408. Likewise, the low frequency signals (e.g., signals from TX_LB1) are directed to the antenna 404 via the RF front-end module 402. One advantageous feature of this antenna allocation is that both high frequency and low frequency signals can be sent to base stations (not shown) by the antenna having high performance at the respective frequency band. Furthermore, an antenna optimized at a relatively narrow band rather than a wide bandwidth makes it possible to provide a compact and cost effective antenna solution for a wireless device.

For clarity, while the embodiment antenna system described above is used for GSM and UMTS, the embodiment antenna system may also be used for Code Division Multiple Access (CDMA) and Multiple Input Multiple Output (MIMO) based $4^{th}$-Generation (4G) systems. For example, in a MIMO based 4G system, a wireless device may be backward compatible with 3G system's antenna diversity. The embodiment system compatible with UMTS and GSM is merely an example, which should not unduly limit the scope of the claims. The present invention is applicable to 3G and 4G wireless systems as well as 2G systems.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising:
  a first antenna configured to operate more efficiently in a first frequency band than in a second frequency band, the first antenna being configured to receive primary signals within the first frequency band and diversity signals within the second frequency band;
  a second antenna configured to operate more efficiently in the second frequency band than in the first frequency band, the second antenna being configured to receive primary signals within the second frequency band and diversity signals within the first frequency band;
  a transceiver comprising:
  a first group of ports configured to receive the primary signals within the first frequency band;
  a second group of ports configured to receive the diversity signals within the second frequency band;
  a third group of ports configured to forward transmission signals within the first frequency band;
  a fourth group of ports configured to forward transmission signals within the second frequency band;
  a fifth group of ports configured to receive primary signals within the second frequency band; and
  a sixth group of ports configured to receive diversity signals within the first frequency band; and
  a plurality of radio-frequency (RF) front-end modules including a first RF front-end module and a second RF front-end module, the first RF front-end module configured to direct the primary signals within the first frequency band from the first antenna to the first group of ports, to direct the diversity signals within the second frequency band from the first antenna to the second group of ports, and to direct the transmission signals within the first frequency band from the third group of ports to the first antenna, and the second RF front-end module configured to direct the transmission signals within the second frequency band from the fourth group of ports to the second antenna, to direct the primary signals within the second frequency band from the second antenna to the fifth group of ports, and to direct the diversity signals within the first frequency band from the second antenna to the sixth group of ports.

2. The apparatus of claim 1, wherein the first frequency band is from about 1700 MHz to about 2170 MHz.

3. The apparatus of claim 2, wherein the second frequency band is from about 700 MHz to about 960 MHz.

4. The apparatus of claim 1 further comprising:
  a plurality of duplexers for providing high isolation between signals received from and transmitted to the plurality of RF front-end modules.

5. The apparatus of claim 1 further comprising:
  a plurality of power amplifiers for amplifying the transmission signals.

6. The apparatus of claim 1, wherein the transceiver is compatible with Global System for Mobile Communications (GSM), Universal Mobile Telecommunications System (UMTS), Code Division Multiple Access (CDMA), and Long Term Evolution (LTE).

7. The apparatus of claim 1, wherein the first antenna has higher antenna gain than the second antenna in the first frequency band, and wherein the second antenna has higher antenna gain than the first antenna in the second frequency band.

8. The apparatus of claim 1, wherein the first antenna has higher antenna gain than the second antenna in a frequency sub-band of the second frequency band.

9. The apparatus of claim 8, wherein signals received from the first antenna in the frequency sub-band of the second frequency band are used as diversity signals.

10. The apparatus of claim 1, wherein the second antenna has higher antenna gain than the first antenna at a frequency sub-band of the first frequency band.

11. The apparatus of claim 10, wherein signals received from the second antenna at the frequency sub-band of the first frequency band are used as diversity signals.

12. The apparatus of claim 1, further comprising:
  a third antenna configured to operate more efficiently in a third frequency band than the first frequency band and the second frequency band.

13. The apparatus of claim 12, wherein the plurality of RF front-end modules are configured to direct signals within the third frequency band from the third antenna to the transceiver and direct transmitted signals having frequencies within the third frequency band from the transceiver to the third antenna.

14. The apparatus of claim 1, wherein the first antenna is configured to receive the primary signals within the first frequency band without receiving the diversity signals within the first frequency band, and
  wherein the second antenna is configured to receive the primary signals within the second frequency band without receiving the diversity signals within the second frequency band.

* * * * *